(12) United States Patent
Bregentzer

(10) Patent No.: US 6,553,765 B2  
(45) Date of Patent: Apr. 29, 2003

(54) TURBOJET ENGINE

(76) Inventor: Daniel Bregentzer, Avenue des Lauriers 5, B-1150 Brussels (BE)

( * ) Notice: Subject to any disclaimer, the term of this patent is extended or adjusted under 35 U.S.C. 154(b) by 54 days.

(21) Appl. No.: 09/871,207

(22) Filed: May 31, 2001

(65) Prior Publication Data

US 2002/0026787 A1 Mar. 7, 2002

(30) Foreign Application Priority Data

May 31, 2000 (EP) .............................. 00870117

(51) Int. Cl.[7] .................. F02C 3/14; F23R 3/40
(52) U.S. Cl. .................. 60/723; 60/732; 60/804
(58) Field of Search .................. 60/39.37, 722, 60/723, 732, 733, 737, 804

(56) References Cited

U.S. PATENT DOCUMENTS

| | | |
|---|---|---|
| 3,691,766 A | 9/1972 | Champion |
| 4,168,609 A | 9/1979 | Greenberg et al. |
| 4,870,824 A * | 10/1989 | Young et al. .......... 60/732 |
| 5,177,956 A | 1/1993 | Shekleton |
| 5,473,881 A | 12/1995 | Kramnik et al. |
| 5,473,882 A * | 12/1995 | Zarzalis et al. ........ 60/733 |

* cited by examiner

Primary Examiner—Louis J. Casaregola  
(74) Attorney, Agent, or Firm—Hovey Williams LLP

(57) ABSTRACT

The present invention deals with a turboreactor comprising at least a precombustion chamber, a combustion chamber, means for directing combustion gases from the precombustion chamber into the combustion chamber, an air compressor, and means for dividing the air flow from the air compressor while guiding it in the combustion chamber. The turboreactor comprises advantageously a contrarotating stator. The invention relates also to a process in which the blades are heated and pushed in a thermoplastic layer of the body of the rotor and/or stator.

14 Claims, 4 Drawing Sheets

TURBOJET ENGINE

BACKGROUND OF THE INVENTION

The present invention deals with a turboreactor or turbojet engine comprising at least a precombustion chamber, a combustion chamber, means for directing combustion gases from the precombustion chamber into the combustion chamber, an air compressor, and means for dividing the air flow from the air compressor while guiding it in the combustion chamber.

THE PRIOR ART

Document GB-A-650,661 discloses a turboreactor comprising at least one compressor drawing and compressing air so as to form at least one principal compressed air flow, one or more combustion chambers, at least one means for supplying fuel to the combustion chamber(s), at least one means for supplying an oxidizing means or air in the combustion chamber(s), and at least one turbine receiving the combustion gases of the combustion chamber(s), said turbine driving the compressor and being followed by an outlet nozzle.

In this known turboreactor, the principal or major airflow of the compressor is essentially used for the combustion of fuel and is introduced, at reduced velocity and in a turbulent form, in the combustion chamber(s) before its use for the necessary mixing for ensuring the complete combustion and its passage through the turbine. The necessary perturbation of the principal air flow is required in order to ensure a substantially homogeneous mixing with the fuel, the production and the stability of the flame, the complete progression of the combustion, with an admissible temperature for the walls of the chamber(s) and for the turbine blades.

Other turbojet engines are disclosed in U.S. Pat. Nos. 5,473,881, 3,691,766, 4,168,609 and 5,177,956, the content of which is incorporated by reference.

In all these known engines, the combustion gases of a prechamber are not directed in the combustion chamber between two distinct compressed air flows coming from an air compressor.

BRIEF DESCRIPTION OF THE INVENTION

In order to avoid these drawbacks, the turboreactor or turbojet engine of the invention comprises at least one precombustion chamber comprising one or more means for supplying fuel and oxidizing medium (preferably air). The precombustion chamber comprises or is associated with means for directing the combustion gases from the prechamber into one or a plurality of combustion chambers. Advantageously, the means for directing the combustion gases from the prechamber into the combustion chamber is a part of the prechamber. The prechamber or precombustion chamber comprises advantageously a mixing and precombusting zone fuel-oxidizing means(preferably fuel-air), possibly preceded with a premixing zone fuel-oxidizing means (air) substantially without combustion.

The turboreactor of the present invention, with a prechamber with a reduced volume which is advantageously bent with respect to the combustion chamber, has the advantage to enable a reduction of the axial overall length (in the longitudinal axis) of the turboreactor, and also a reduction of pressure losses of the gases along their path through the zones necessary for a complete combustion. Moreover, the turboreactor comprises a means for directing at least a portion of the main stream of air flow of compressed air from the compressor in one, several, or each of the plurality of combustion chambers, said means being arranged in relation to the means for supplying the combustion gases from the prechamber in one, several or each of the plurality of combustion chambers so that at least a portion of the main stream (FP) of compressed air from the compressor which is guided into one, several or each of the plurality of combustion chambers creates an aspiration of the combustion gases from the prechamber (a depression formed in the combustion chamber extracting combustion gases from the prechamber) in order to ensure at least the transit of the gases from the prechamber to the combustion chamber and also for obtaining in said combustion chamber, a complementary, advantageously substantially complete combustion of the fuel which was not burnt in the precombustion chamber, such aspiration or sucking being advantageously combined with a mixing of the combustion gases with a portion of the main stream of compressed air in one, several or each of the plurality of combustion chambers. Advantageously, said means is agenced or adapted for ensuring also an air supply into the precombustion chamber.

It is clear that the turboreactor may comprise one or several precombustion chambers or prechambers of combustion associated to one or several combustion chambers. So, for example, the turboreactor comprises several distinct precombustion chambers whose combustion gases are directed in only one combustion chamber and/or several distinct precombustion chambers whose combustion gases are directed in several distinct combustion chambers, in particular whose combustion gases of each prechamber are directed in one distinct combustion chamber. In the present specification, "prechamber" or "precombustion chamber" means one or several distinct prechambers or precombustion chambers, in particular placed in parallel, while "chamber or combustion chamber" means one or several combustion chambers, in particular placed in parallel.

The turboreactor or turbojet of the invention has means for directing at least a portion of the main stream of compressed air from the compressor in the combustion chamber, said means having a series of passages dividing the main stream into a series of compressed air flows flowing in the combustion chamber. Said passages are designed with respect to the means directing the combustion gases from the precombustion chamber to the combustion chamber so that each mean directing the combustion gases from the precombustion chamber into the combustion is located between two passages dividing the main stream of compressed air and so that the compressed air flows issued from the division of the main air flow creates a depression in the combustion chamber with respect to the precombustion chamber and a suction of the combustion gases from the precombustion chamber into the combustion chamber. In said turbojet engine, a series of distinct flows of combustion gases from the precombustion chamber(s) (such as more than 3 flows, advantageously more than 4, preferably more than 5, most preferably more than 6, such as 7,10, or even more than 10) are formed. Said flows are separated the one from the other by a compressed airflow coming from the compressor.

Advantageously in the turboreactor or turbojet engine of the invention, the compressor and/or the means for directing at least a portion of the main stream of compressed air or principal compressed air flow from the compressor into the combustion chamber are arranged to ensure for the portion of the main stream entering the chamber at a velocity which is at least higher than the velocity of the gases flowing out of the prechamber, advantageously at least two times as high as the velocity of the gases flowing out of the prechamber, preferably at least five times as high as the velocity of the gases flowing out of the prechamber and in order to ensure that the combustion chamber is in depression at least in relation to the precombustion chamber, preferably in relation to the precombustion chamber and the surroundings of the precombustion chamber.

Advantageously, the means directing at least a part of the main stream or principal flow of compressed air coming from the compressor consists of a wall of the means ensuring the passage of gases from the prechamber to the chamber or of a wall associated to the means ensuring the passage of gases from the prechamber to the chamber.

Advantageously, the means directing at least a portion of the main stream or principal flow of compressed air flowing from the compressor to the combustion chamber is designed or adapted so that substantially all the compressed air flow flowing out of the compressor is directed to flow in the combustion chamber without being significantly disturbed either in velocity, either in direction. This embodiment is advantageous as it enables to reduce pressure losses or pressure drops of the air flow and gas flow in all the means necessary to the combustion, said pressure losses being not negligible for classical combustion chambers. For example, the velocity of the principal or main flow of compressed air flowing through the combustion chamber is at least 75% of the initial velocity of the principal flow entering in the combustion chamber, in particular at least 85% of the initial velocity of the principal flow entering in the combustion chamber during the passage, preferably substantially equal to the initial velocity of the principal flow entering in the combustion chamber According to an advantageous embodiment, in relation to the position of the means (forming advantageously a part of the prechamber) for directing the combustion gases from the prechamber into the combustion chamber, the means for supplying fuel and oxidizing medium (such as air) in the prechambex are located closer to the turbine of the turbojet engine or are spaced a longer distance from the compressor. In other words, the prechamber with its means for supplying fuel and oxidizing medium (preferably air) is advantageously designed or adapted so that the flow of combustion gases in the prechamber is directed in a direction substantially opposite to the gas flow in the combustion chamber. This embodiment is advantageous as the axial or longitudinal length of the chambers is reduced, while enabling however all the essential phases of the process, namely injection, mixing fuel-oxidizing medium (air), inflammation, mixing, precombustion and combustion.

In the turboreactor or turbojet engine of the invention, liquid fuels such as petrol, benzine, kerosene, etc., as well as gazeous fuel such as methane, etc. can be used. When using a liquid fuel, it is advantageous that its supply to the prechamber is made by a pipe in contact with a hot part of the turboreactor so as to ensure a natural vaporization of the fuel at the fuel injection in the prechamber.

As oxidizing means, air coming from the compressor and/or external compressed or pressurized air (not coming from the compressor of the turboreactor) and/or any appropriate oxidizing medium (such as oxygen) is advantageously used. In particular, for the combustion in the prechamber or precombustion, air directly coming from the compressor and/or air coming from the main flow of compressed air is at least partly used. Air coming from the compressor can be directed in the prechamber without flowing through the combustion chamber, said air being for example mainly directed by one or more ducts, pipes or openings, advantageously substantially close to the axis of the turboreactor, in the prechamber through the sides or walls of the prechamber directed towards the axis of the turboreactor and/or the front side or wall (side or wall directed towards the compressor) of the prechamber and/or the rear side or wall or bottom of the prechamber (side or bottom directed towards the turbine).

According to a possible embodiment, the turboreactor or turbojet engine of the invention has means ensuring a passage for compressed air flowing from the compressor into the prechamber, said means being adapted or designed so that the ratio between the stream or flow of compressed air flowing from the compressor and into the prechamber and the stream or flow of compressed air flowing from the compressor and into the chamber is smaller than 1/5, advantageously smaller than 1/8, preferably smaller than 1/10, more preferably less than 1/20. The ratio will be adjusted as required, in particular in function of the maximum admissible turbine temperature.

According to a detail of a preferential embodiment, the turboreactor has means ensuring a passage for combustion gas from the combustion chamber into the prechamber, said means being arranged or designed so that gases from the chamber flow into the prechamber between the fuel supply means in the prechamber and the means which form advantageously part of the prechamber and which direct the combustion gases from the prechamber into the combustion chamber.

The passage of gases from the combustion chamber to the prechamber and/or the passage of air directly coming from the compressor into the prechamber enables to ensure the precombustion by use of a better mixing of fuel-oxidizing medium(air) in the prechamber and/or by use of the progressive increase of the air proportion during the precombustion step.

According to another advantageous detail, the means (forming advantageously a wall of the prechamber) for directing the combustion gases of the prechamber in the combustion chamber comprise or form means dividing the stream or flow of compressed air flowing from the compressor in one or more first stream(s) or flow (s) entering into the chamber and in one or more second stream(s) or flow(s) supplying the prechamber through openings of its envelope, said second stream(s) or flow(s) having a lower flow rate than the first stream(s) or flow(s), in particular well below the first flow(s) or stream(s) so as to enable a limited volume or size for the prechamber. The prechamber comprises advantageously means for directing said second stream(s) or flow(s) or a portion thereof in the prechamber and/or in one or a plurality of means for directing the combustion gases from the prechamber into the combustion chamber, for supplying said prechamber or means with oxidizing medium (air).

Preferably, means dividing both air flows is adapted so that the ratio second air flow(s)/first air flow(s) is lower than 1:5, advantageously lower than 1:8, preferably lower than 1:10, in particular lower than 1:20.

It has also been found advantageous that said means direct compressed air in the prechamber or in its part forming the means directing the combustion gases of the prechamber into the chamber. This air supply ensure a better mixing air and gases with the fuel permitting the precombustion. The means supplying compressed air is or forms, for example, one or more external compressed air injectors or nozzles or one or more openings bored or present in the wall(s) of the envelope of the prechamber. Due to the suction or drawing force exerted on the gases of the prechamber by the power and/or high relative velocity of the main or principal compressed air flow flowing in the combustion chamber, air coming from the compressor is sucked through one or more openings bored or present in the envelope of the prechamber.

When the turboreacror or turbojet engine is provided with means ensuring a passage for the gases from the chamber into the prechamber, said means are advantageously arranged such as not to be located in the wake or path or extension of the stream or flow of gases leaving the means for guiding the gases from the prechamber into the combustion chamber. This enables to ensure that gases passing from the combustion chamber into the prechamber contain only a few combustion gases or are essentially constituted of air coming from the principal compressed airflow.

According to an advantageous detail of an embodiment, at least a part or portion of the prechamber, particularly at least one part of its means guiding its combustion gases from the prechamber into the chamber, is provided with a lining or coating or layer containing at least a combustion catalyst.

According to an advantageous characteristic of the turboreactor or turbojet engine, the compressor includes a stator which is at least partially rotatable (for example fully rotating), in particular at least partially contrarotatable (for example fully contrarotating) in relation to the rotor, possibly fixedly attached to an external fan or the rotor of an external auxiliary compressor. According to a possible embodiment, the stator comprises a fixed part and a rotating part, in particular a contrarotating part, said rotating or contrarotating part being related or connected to an own turbine. The outer wall of the rotating stator, particularly contrarotating, is possibly joint to a rotor of an auxiliary compressor or an auxiliary fan or to elements forming an auxiliary compressor or fan. This auxiliary compressor or fan forms an external compressor or fan which is advantageously placed into the axial or longitudinal limits between the axial ends of the principal or main compressor or fan, so as to reduce the volume in its longitudinal direction. The air flowing out of the auxiliary compressor or fan advantageously serves or acts for diluting the gases escaping the central part of the turboreactor, enabling therefor an improvement of the propulsion or jet output.

According to a detail of a turboreactor, the compressor includes a stator provided with blades and a rotor provided with blades, the body of the rotor and/or of the stator comprising a layer or coat of thermoplastic material or being made of a thermoplastic material in which the blade bases or roots made of a heat conductive material (preferably an electrically conducting material, in particular in metal or anyone metal alloy suitable for the compressor blades and suitable to stick to the thermoplastic material) are embedded.

The invention relates also to a turboreactor or turbojet engine of the type disclosed in the first paragraph of the present specification, in which the compressor comprises a stator and a rotor (rotating with respect to the stator and with respect to the frame of the turboreactor), the stator being also at least partly rotating (for example wholly rotating) with respect to the frame and at least partly contrarotating with respect to the rotor. This design permits to compress more or less the air flowing through the compressor, without requiring high rotational velocities for the rotor and its turbine, this enabling to reduce the number of stages of the compressor and therefor its size. The rotating part of the stator is joined to its own turbine. This turboreactor is constituted of an envelope, a compressor to compress air for forming at least a main or principal compressed air flow, a combustion chamber, at least means to supply fuel into the combustion chamber, at least one means for supplying air or an oxidizing medium into the combustion chamber and at least two turbines receiving combustion gases from the combustion chamber, the compressor comprising a stator (totally or partly rotating with respect to the frame) and a rotor (rotating with respect to the stator and to the frame), the rotating part of the stator being joined to one or more stages of a turbine, the rotor being joined to one or more other stages of another turbine. The stage(s) of the rotating stator turbine and the stage(s) of the rotor turbine are designed so that the stator contrarotates with respect to the rotor. Advantageously the rotating part of the stator is joined to a fan or constitutes a frame or body of an auxiliary compressor rotor on its outer side or wall or face directed towards the envelope for creating an outer (additional) air flow or an (additional) air flow along the wall of the envelope, said additional air flow being mixed at the outlet of the turboreactor in order to increase the propulsion or jet output, without significant increase of the overall length of the main or principal compressor.

Another object of the invention is a method for fixing heat conducting elements or elements into a thermoplastic coat, in particular to form elements provided with blades or fins, and more specifically in order to construct a rotor and/or a stator of a compressor.

This process intended to fix at least one end of a heat conducting element into a thermoplastic coat or layer consists at least to heat at least the end of the element to a temperature higher than the softening temperature, preferably the melting temperature of the thermoplastic material, and to press the element into the coat in order to enable the penetration of the end of the element into the thermoplastic coat or layer. Particularly the end of the element is heated to a temperature 10 to 50° C. higher than the melting temperature of the thermoplastic material without reaching a carbonization step (for example by heating below the carbonization or degradation temperature or by submitting the thermoplastic material to a temperature higher than the carbonization temperature during a short time).

Advantageously, the thermoplastic coat or layer is provided with holes, recesses or cavities or threads or grooves at the places where the end of the element(s) has(have) to be inserted. These holes, cavities, recesses, grooves or threads permits the softened or melted thermoplastic material to flow therein when the blade penetrates into the thermoplastic material, These cavities, holes, grooves, recesses or threads receiving this flow of softened or melted thermoplastic material as well as the end of the element to be inserted during its penetration in the thermoplastic coat or layer.

For inserting elements, said elements have advantageously heat conductive elements having a softening point higher than the melting temperature of the thermoplastic coat or layer. Particularly, this softening or melting point of the heat conductive element to be inserted into the thermoplastic coat or layer is at least 100° C. higher than the melting temperature of the thermoplastic coat. The end of the element, advantageously metallic, which is inserted in the thermoplastic coat or layer, is advantageously shaped or worked so that said end has a smaller section than the body of the element, for example for its heating and/or for its positioning.

Instead of using complex injection moulds with places for inserts, or to proceed to local heating of the thermoplastic coating or layer obtained by the complex means of ultrasonic devices, it is advantageously processed to the heating of the element or the end thereof by conduction, convection or radiation. Preferably, this heating is carried out by the flow of electrical current through the element.

Particularly, a subject matter of the invention is a process for placing blades made in electrical conducting material on a stator and/or a rotor of a turboreactor, particularly a turboreactor according to the invention, this stator and/or rotor being provided with a coating or layer of thermoplastic layer or made of thermoplastic material, in which the end of the blade to be inserted into the thermoplastic coating or layer is heated at a temperature higher than the melting temperature of the thermoplastic material, and by pressing the end of the blade against the thermoplastic coating or layer in order to insert this end into the thermoplastic coating or layer.

This process is not only an easy and simple process, but it also enables to constitute all or part of the rotor of the compressor in a light material permitting it to rotate more rapidly without reaching to early its critical rotation velocities.

Preferably, the end of the element is heated to a temperature 10° C. to 50° C. higher than the melting temperature of the thermoplastic material without to carbonize it (temperature less than carbonizing temperature or heating very shortly above this temperature).

Accordingly, the thermoplastic material is provided with holes, hollows, grooves, cavities, etc. Said holes, grooves, recesses, cavities, hollows, etc. are preferably adjusted in order to receive the melted thermoplastic flow when the (heated) end of the blade penetrates into the thermoplastic material, they also serves as vent or air escaping holes and/or as means for facilitating the positioning of the blade.

For example, the cavities, grooves, holes, recesses, hollows, etc. have a chamber adapted for receiving softened or molten thermoplastic material when the blade is inserted into the thermoplastic coating or layer. In this process, use is advantageously made of heat conducting elements having a softening point or melting point above the melting temperature of the thermoplastic coating or layer. In particular, the softening temperature or melting temperature of the heat conducting element to be inserted into the thermoplastic coating or layer is at least 100° C. higher than the melting temperature of the thermoplastic coating or layer. According to an embodiment of the process, the end of the element, advantageously metallic, which is inserted in the thermoplastic coating or layer, is advantageously worked or shaped so that said end has a portion with a smaller section than the body of the element, notably for facilitating its heating and/or its positioning.

Details and characteristics of the invention will appear from the following detailed description in which reference is made to the attached drawings.

BRIEF DESCRIPTION OF THE DRAWINGS

In these drawings.

Figure 1:
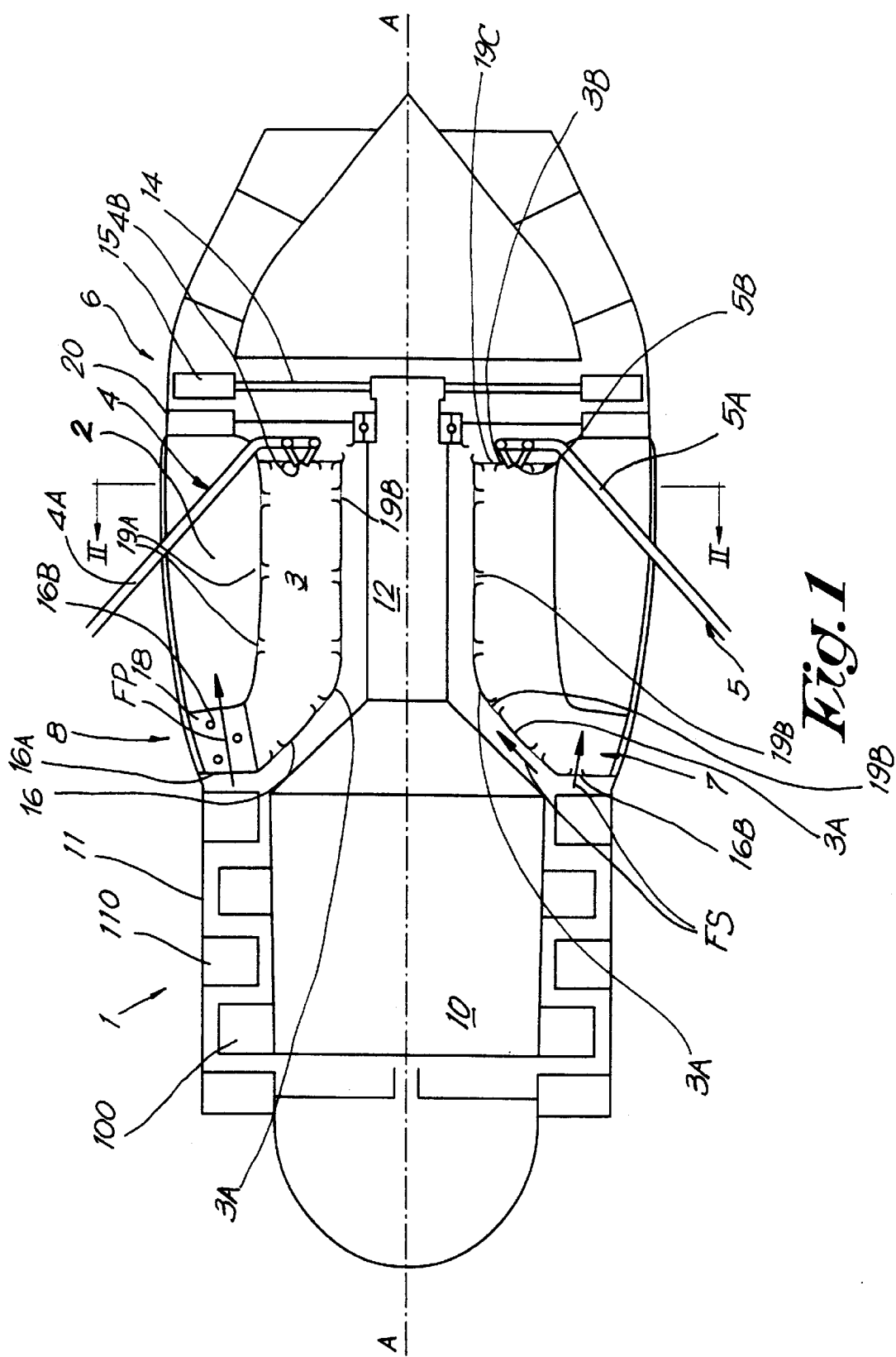
FIG. 1 is a schematic section view of a turboreactor according to the invention.
Figure 2:
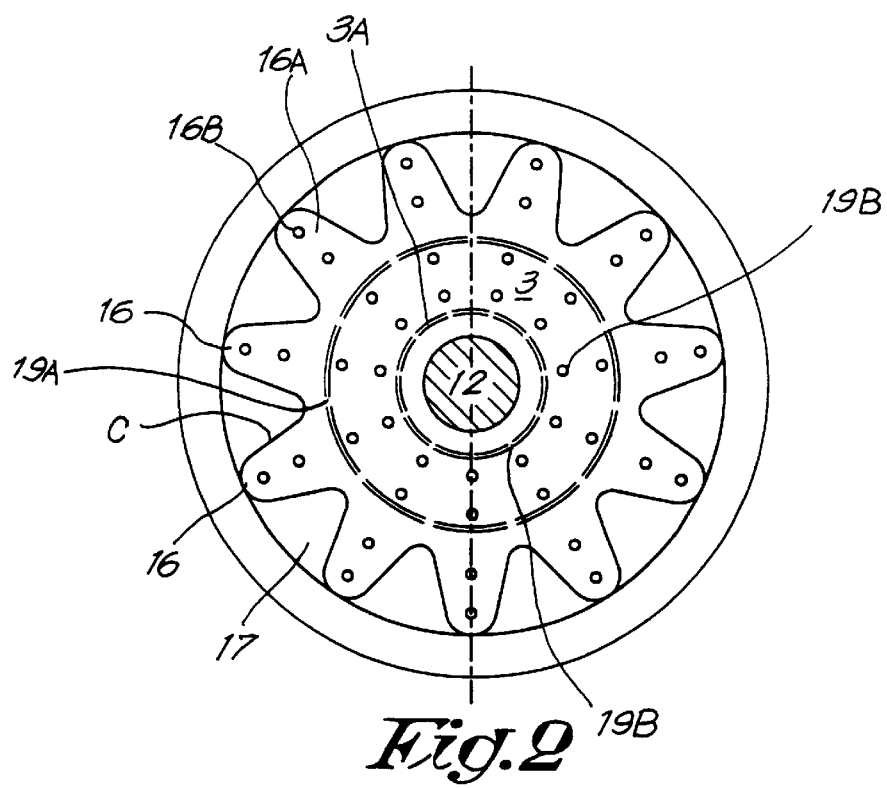
FIG. 2 is a section view along the line II—II of the turboreactor of FIG. 1.
Figure 3:
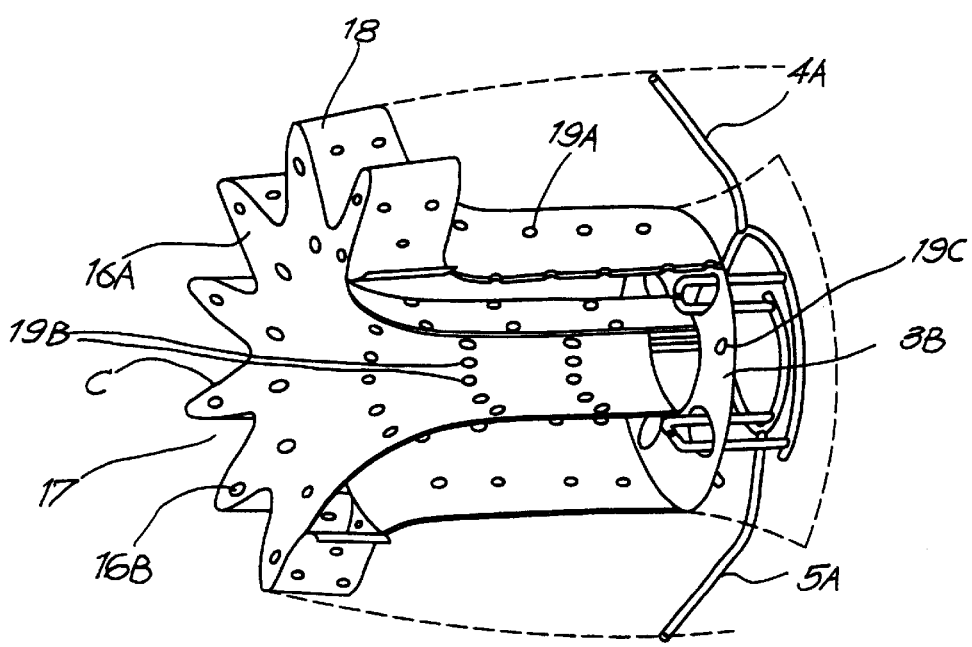
FIG. 3 is a perspective view (with cut away portions) of the prechamber or precombustion chamber of the turboreactor of FIG. 1.

The turboreactor of FIG. 1 comprises a compressor 1 drawing and compressing air so as to form at least one principal or main compressed airflow FP, a combustion chamber 2, a substantially bent or curved precombustion chamber or prechamber 3, a means 4 for supplying fuel in the prechamber 3, at least a means 5 for supplying oxidizing medium (air or gas surrounding the precombustion chamber, possibly external compressed air) in the precombustion chamber 3, a means 7 of the prechamber for directing the combustion gases from the prechamber into the combustion chamber 2, and at least one turbine receiving combustion gases of the combustion chamber 2.

The combustion chamber 2 is associated with means 8 receiving and directing at least a part of the main compressed air flow from the compressor, said means being agenced with respect to the means directing the combustion gases of the prechamber to the combustion chamber so that the power and relative velocity of the main compressed airflow or of the part thereof which is directed in the combustion chamber form an high suction of the combustion gases of the prechamber 3 and a mixing of the combustion gases of the prechamber 3 with at least a part of the principal or main compressed airflow in order to ensure the complete combustion of the non burnt fuel and the dilution of gases with air in excess. In fact, the precombustion chamber 3 has a pressure above the internal pressure of the combustion chamber 2. The means 8 is preferably adapted for creating a plurality of adjacent (but distinct) compressed air flows in the combustion chamber 2. Advantageously more than 6 adjacent and distinct compressed air flows (preferably more than 8, most preferably from 10 to 50) are formed in the combustion chamber 2. Between two compressed air flows, a flow of combustion gases from the precombustion chamber is formed.

As shown, the compressor comprises a rotor 10 with blades 100 and a stator 11 with blades 110. The rotor 10 is extended with a shaft 12, the end of which is fixed to a disc 14 provided with blades 15, said blades forming blades of the turbine 6. When the turbine 6 is driven in rotation by the combustion gases coming from the combustion chamber 2, the shaft 12 is driven in rotation, whereby the rotor rotates with respect to the stator 11. The rotation of the rotor leads to a drawing or sucking of air and to its compression, creating the compressed air flow.

The compressed airflow coming from the compressor is divided into a main or principal airflow FP and a secondary airflow FS. This separation of compressed airflow from the compressor is obtained by the wall 16 of the prechamber directed towards or facing the compressor, the external edge is cut or shaped in the vicinity of the combustion chamber so as to form teeth 16A, two adjacent teeth being separated by a passage 17. The edge of the wall 16 is extended towards the turbine 6 by a cap or profile 18 following substantially the form of the external edge C of the wall and teeth 16A. The wall 16 is extended by the wall 3A of the prechamber 3, wall directed towards or facing the axis of rotation A—A of the turboreactor, said wall being funnel-shaped. Compressed air of compressor 1 flows in the central channel of the funnel in which the shaft of the rotor 10 is located, before being introduced into the prechamber through openings or apertures 19B and 19C of the wall 3A and of the rear wall or bottom 3B of the prechamber. The compressed air flowing through passages 17 forms a main flow FP, said flow being directed by the outer face of the cap or profile 18, before entering the combustion chamber 2. The teeth 16A (fully opened towards the rear or turbine side of the combustion chamber 2) form a wall of the means 7 guiding the combustion gases of the prechamber 3 to the combustion chamber 2, while the internal face of the cap or profile 18 forms another wall of the means 7. The teeth 16A and/or the profile 18 have one or more openings 163 allowing a passage of compressed air from the compressor 1 in the means 7. The compressed air entering into the means 7 by the passages 16B, as well as the openings or apertures 19A,19B,19C supplies the prechamber 3 with oxidizing medium (air) and ensures the precombustion.

The prechamber 3 and the cnamber 2 are separated from each other by substantially cylindrical wall 19. The wall 19 has several passages 19A allowing a passage of gases from the combustion chamber 2 towards the prechamber 3. In order to ensure that the gases of the chamber 2 entering into the prechamber 3 have a minimum content in burned gas and a maximum oxygen content, the passages 19A are disposed or located in the flowpath of the main airflow coming from the passages 17.

The means 4 feeding fuel into the prechamber 3 comprises a pipe 4A extending through the chamber 2 and ending with an injection device 4B for fuel injection purposes (the fuel being vaporized at the outlet of the injection due to the heating of the fuel when flowing through the pipe 4A extending in the chamber 2) leading the fuel towards the means 7. A means 5 for feeding or supplying additional or supplementary oxidizing means, such as compressed air external to the compressor, comprises for example a pipe 5A extending in the chamber 2 and ending with the injection device SB directing the oxidizing medium (air) towards the means 7.

The gases flowing out of the chamber 2 are ducted through fixed blades 20, towards the blades of the turbine 6 so as to ensure its rotation.

The secondary compressed airflow, in the shown embodiment, corresponds only to a fraction or part of the principal compressed airflow.

In case the openings 16B,19A,19B and 19C allows a sufficient supply of air or oxidizing medium to the prechamber, it is possible not to have to use the means 5.

The walls of the prechamber 3 and of the means are advantageously coated partially or completely with a catalytic material ensuring a better combustion.

Figure 4:
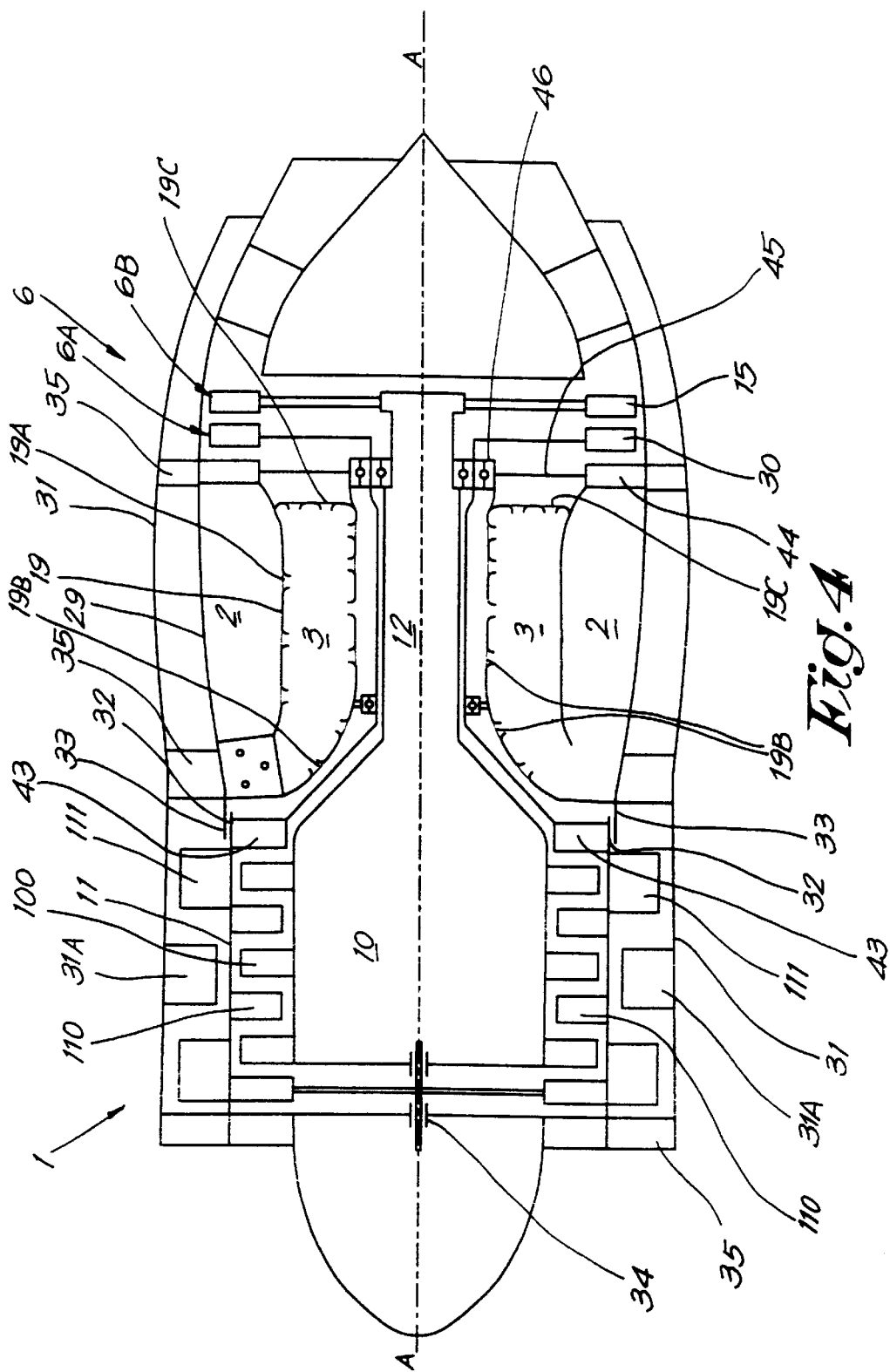
FIG. 4 is a schematic view of an embodiment of a turboreactor of FIG. 1.

The turboreactor of FIG. 4 is similar to that represented in FIG. 1, except that the compressor 1 comprises a stator totally contrarotative driven into rotation by a specific stage 6A (blades 30) of the turbine 6 and constituting an auxiliary external compressor rotor.

The turboreactor comprises an outer fixed envelope 31 with internal blades 31A. The rotating stator 11 has on its inner face blades 110 working with the blades 100 of the central rotor 10 in order to compress air and form the principal or main air flows. On its outer face, the stator 11 has blades 111 ensuring the compression of an auxiliary outer flow along the shape of the envelope 31 of the turboreactor. The combustion chamber 2 and the precombustion chamber 3 are together attached to the envelope 31. A fluid joint or seal 32 ensures the tightness between a ring 33 fixed to the envelopes 29 and 31 and the rotating stator 11.

Bearings 34 permit the rotation of the rotor 10 and the stator 11 around the central axis A.

The envelope 31 is joint to the rods 35 for supporting the combustion chamber 2, the precombustion chamber 3 and the bearings 34.

The stator is extended with a element forming a hollow cylinder 40 giving the passage to the shaft 12 of the rotor 10. The part 11 of the stator carrying the blades 110 is fixed to the cylinder 40 with binding rods 43 serving as fixed blades permitting and directing the passage of the air coming from the compressor 1 towards the chamber 2 and towards the prechamber 3 through the openings 19B and 19C.

In the front of the blades 30 of the stage 6A of the turbine, fixed blades 44 attached to the envelope 31 via the internal envelope 29 are ducting the combustion gases. The fixed blades 44 are joined to a disc 45 carrying the bearing 46.

Possibly, the blades 111 and 31A forming the auxiliary compressor could be replaced by a fan.

In the turboreactor of FIG. 4, the stator could also be only partially rotating.

Despite the stator 11 can rotate with the same direction than the rotor 10, it can be advantageous to dispose the blades 30 and 15 in order to make the stator 11 contrarotative according to the rotor, increasing so the relative velocity of the blades stator-rotor, to ensure for example to the compression a greater compression ratio, or a reduction of the number of its stages, reducing its axial length, either also lowering the necessary mechanical rotational strains of the rotor and its turbine by lowering the necessary rotational velocity. The invention has also for subject matter a turboreactor of the type disclosed in the first paragraph of the present specification, but with a stator of the compressor similar to the compressor described for the turboreactor of FIG. 4.

The rotor and/or stator frame of the compressor 1 of the turboreactor shown in FIGS. 1 and 4 is advantageously made by means of a coating or layer of thermoplastic material in which are inserted blades 201 made of heat conductive material, for example blades made of metal or metal alloy which can stick to thermoplastic material.

Figure 5:
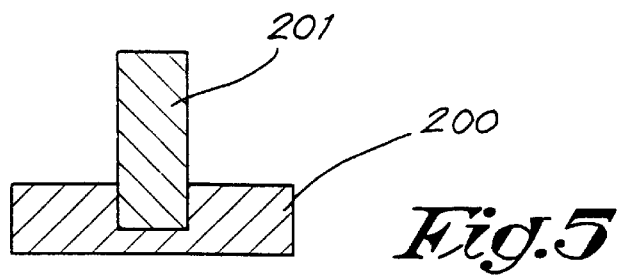
FIGS. 5 to 9 show fabrication steps of a stator and/or rotor of a compressor adapted to be used in a turboreactor.

For example, the body of the rotor is made of appropriate metal or metal alloy and is provided with a layer of thermofusible material, for example thermofusible elastomer, thermoplastic material possibly containing a filler. For placing the blades 201, the end of the blades is heated and said end is pushed (with an appropriate pressure) in the layer 200, either individually, either by groups of blades with appropriate equipment, in such a way that said end is inserted and blocked in the layer 200 (FIG. 5).

Advantageously, the pressing step of a blade into the layer 200 is made once the blade temperature or the temperature of its end to be inserted into the thermoplastic layer is above the melting temperature of the thermofusible (thermoplastic) material, for example from 5 to 50° C. above the melting temperature of the thermofusible layer, but lower than the carbonization temperature.

Figure 6:
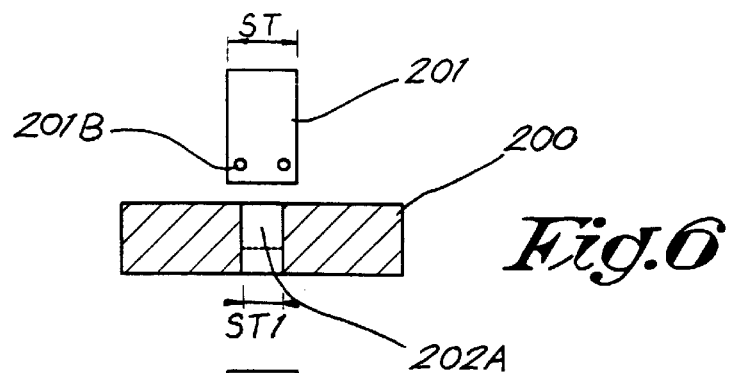
Figure 7:
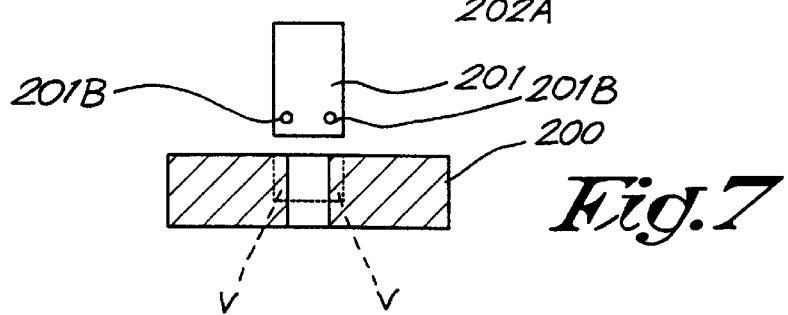
Figure 8:
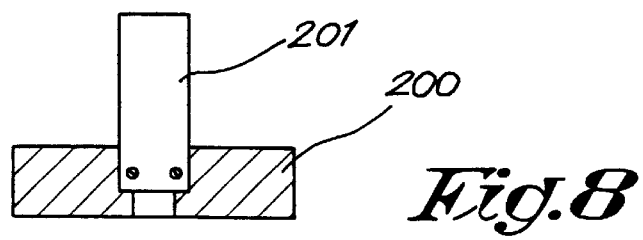

In order to ensure a more adequate penetration of the end 201A of the blade in the layer 200, the layer is provided with cavities or recesses or holes 202 at the place where blades have to be placed Said cavities or recesses 202 have advantageously a section or chamber 202A suitable for receiving molten material when the end 201A of the blade is inserted in the recess and part of the body of the element or element to be inserted. The transversal section ST of the element 201 is advantageously higher than that of the recess, while the volume of the chamber 202A advantageously corresponds to the volume V of melted material necessary for the correct insertion of the element into the layer (FIGS. 6 to 8).

Figure 9:
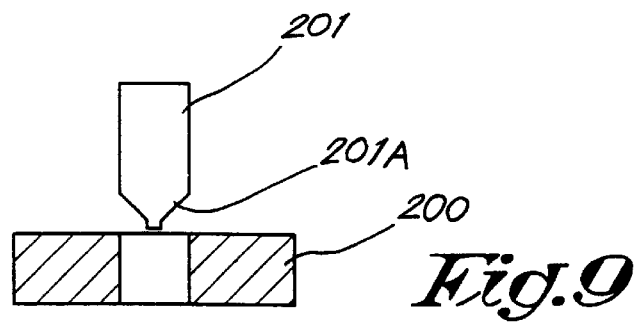

The end 201A of the blade which has to be inserted in the layer 200 is advantageously shaped so as to ensure a more correct positioning of the blade, in particular so as to avoid the formation of important pads or to ensure an optimal evacuation of the molten thermoplastic material. (FIG. 9)

In order to ensure a better fixation of element 201, the element is advantageously supplied with one or several holes or passages 201B within the part of the element to be inserted in the coating 200. Said holes or passages are suitable for forming a binding in thermoplastic material extending through the element. This is particularly advantageous for flat elements to be inserted into the later 200, for example for elements with a thickness of less than 10 mm, advantageously of less than 5 mm. Preferably, the element has two or more than two (for example 3,4,5, etc.) holes or passages in the part to be inserted in the thermoplastic layer.

In the embodiments shown in the figures, the precombustion chamber is located between the axis of rotation A—A and the combustion chamber. However, in possible embodiments, the precombustion chamber can be located externally with respect to the combustion chamber, i.e. the combustion chamber being located between the precombustion chamber and the axis of rotation of the turboreactor.

In the specification, means for feeding or supplying oxidizing medium, such as air, in the prechamber 3, are for example injection device 5B, openings or apertures or passages in the wall defining the housing of the prechamber (19A,19B,19C, 16B), etc.

Means for directing the combustion gases from the prechamber into the combustion chamber are formed in the embodiment shown by walls of the teeth 16A and of the profile 18, said means can also be formed by a housing or baffle(s) or one or more distinct conduits or pipes having an opening directed towards the prechamber and another opening directed towards the combustion chamber.

What I claim is:

1. A turbojet engine comprising
   a compressor sucking and compressing air in order to form at least one main stream of compressed air,
   at least one combustion chamber,
   at least one turbine receiving the combustion gases from the at least one combustion chamber,
   at least one precombustion chamber including at least means for supplying an oxidizing medium and a fuel therein,
   means for directing the combustion gases from the precombustion chamber into the combustion chamber,
   means for directing at least a portion of the main stream of compressed air from the compressor in the combustion chamber, said means having a series of passages dividing the main stream into a series of compressed air flows flowing in the combustion chamber, in which said passages are designed with respect to the means directing the combustion gases from the precombustion chamber to the combustion chamber so that each means directing the combustion gases from the precombustion chamber into the combustion is located between two passages dividing the main stream of compressed air and so that the compressed air flows issued from the division of the main air flow creates a depression in the combustion chamber with respect to the precombustion chamber and a suction of the combustion gases from the precombustion chamber into the combustion chamber.

2. The turbojet engine of claim 1, in which the compressor and the means for directing at least a portion of the main stream of compressed air from the compressor into the combustion chamber are arranged to ensure for the portion of the main stream entering the chamber a velocity which is at least higher than the velocity of the gases flowing out of the precombustion chamber, ensuring that the combustion chamber is in depression at least in relation to the precombustion chamber.

3. The turbojet engine of claim 1, in which the compressor and the means for directing at least a portion of the main stream of compressed air from the compressor into the combustion chamber are arranged to ensure for the portion of the main stream entering the chamber a velocity which is at least two times as high as the velocity of the gases flowing out of the precombustion chamber, ensuring that the combustion chamber is in depression at least in relation to the precombustion chamber.

4. The turbojet engine of claim 1, in which the compressor and the means for directing at least a portion of the main stream of compressed air from the compressor into the combustion chamber are arranged to ensure for the portion of the main stream entering the chamber a velocity which is at least five times as high as the velocity of the gases flowing out of the precombustion chamber, ensuring that the combustion chamber is in depression at least in relation to the precombustion chamber.

5. The turbojet engine of claim 1, in which, in relation to the position of the means for directing the combustion gases from the precombustion chamber into the combustion chamber, the means for supplying fuel and oxidizing medium in the precombustion chamber are located closer to the turbine of the turbojet engine with respect to the means directing the combustion gases from the precombustion chamber into the combustion chamber.

6. The turbojet engine of claim 1, in which the means for directing at least a portion of the main stream of compressed air from the compressor in the combustion chamber defines at least four passages dividing the main stream into a series of compressed air flows flowing in the combustion chamber.

7. The turbojet engine of claim 1, which further comprises means ensuring a passage for compressed air flowing from the compressor into the precombustion chamber, said means being adapted so that the ratio between the stream of compressed air flowing from the compressor into the precombustion chamber and the stream of compressed air flowing from the compressor into the combustion chamber is smaller than 1/5.

8. The turbojet engine of claim 1, which further comprises means ensuring a passage for compressed air flowing from the compressor into the precombustion chamber, said means being adapted so that the ratio between the stream of compressed air flowing from the compressor into the precombustion chamber and the stream of compressed air flowing from the compressor into the combustion chamber is smaller than 1/10.

9. The turbojet engine of claim 1, which further comprises means ensuring a passage for gas from the combustion chamber into the precombustion chamber, said means being arranged so that gases from the combustion chamber flow into the precombustion chamber between the fuel supply means in the precombustion chamber and the means directing the combustion gases from the precombustion chamber into the combustion chamber.

10. The turbojet engine of claim 1, in which the means directing the combustion gases of the precombustion chamber into the combustion chamber include means dividing the stream of compressed air flowing from the compressor in a series of first streams flowing into the combustion chamber and in a second, stream, said second stream having a lower flow rate than the sum of said first streams, and in which the engine includes means directing at least a portion of said second stream in an element selected from the group consisting of the precombustion chamber, means for directing the combustion gases from the precombustion chamber in the chamber, and their combination.

11. The turbojet engine of claim 9, in which the means ensuring a passage for gases from the combustion chamber into the precombustion chamber are arranged such as not to be located in the wake or extension of the stream of gases leaving the means guiding the gases from the precombustion chamber into the combustion chamber.

12. The turbojet engine of claim 1, in which the compressor includes a stator selected among the group consisting of at least partially rotatable stator and at least partially contrarotatable stator in relation to the rotor.

13. The turbojet engine of claim 1, in which the compressor includes a stator comprising a body provided with blades and a rotor comprising a body provided with blades, at least one body selected from the group consisting of the body of the rotor and the body of the stator comprising at least a layer of thermoplastic material in which the blade bases made of a heat conductive material are embedded.

14. The turbojet engine of claim 1, in which at least one element selected from the group consisting of the precombustion chamber and the means guiding the combustion gases from the precombustion chamber into the combustion chamber is provided at least partially with a coating containing at least one combustion catalyst.

* * * * *